United States Patent
Feng (10) Patent No.: US 8,837,494 B2
(45) Date of Patent: Sep. 16, 2014

(54) ENCODING VIRTUAL LAN TAGS (71) Applicant: Broadcom Corporation, Irvine, CA (US)

(72) Inventor: Weimin Feng, Johns Creek, GA (US)

(73) Assignee: Broadcom Corporation, Irvine, CA (US)

( * ) Notice: Subject to any disclaimer, the term of this patent is extended or adjusted under 35 U.S.C. 154(b) by 137 days.

(21) Appl. No.: 13/663,509

(22) Filed: Oct. 30, 2012

(65) Prior Publication Data

US 2013/0215895 A1 Aug. 22, 2013

Related U.S. Application Data (60) Provisional application No. 61/602,043, filed on Feb. 22, 2012.

(51) Int. Cl.
*H04L 12/26* (2006.01)

(52) U.S. Cl.
USPC ..................................................... 370/395.53

(58) Field of Classification Search
None
See application file for complete search history.

(56) References Cited

U.S. PATENT DOCUMENTS

| | | | |
|---|---|---|---|
| 6,337,863 B1 * | 1/2002 | Nair et al. | 370/395.53 |
| 2007/0211763 A1 * | 9/2007 | Solomon et al. | 370/498 |
| 2009/0049196 A1 * | 2/2009 | Smith et al. | 709/245 |
| 2010/0208593 A1 * | 8/2010 | Soon et al. | 370/242 |
| 2010/0235544 A1 * | 9/2010 | Smith et al. | 709/246 |
| 2011/0122893 A1 * | 5/2011 | Kang et al. | 370/477 |
| 2011/0128975 A1 * | 6/2011 | Kang et al. | 370/477 |
| 2013/0044763 A1 * | 2/2013 | Koponen et al. | 370/401 |
| 2013/0091349 A1 * | 4/2013 | Chopra | 713/150 |
| 2013/0142203 A1 * | 6/2013 | Koponen et al. | 370/401 |
| 2013/0279513 A1 * | 10/2013 | Eastlake, III | 370/410 |

* cited by examiner

*Primary Examiner* — Anh-Vu Ly
(74) *Attorney, Agent, or Firm* — Foley & Lardner LLP (57) ABSTRACT

Various embodiments are disclosed for encoding and decoding VLAN identifiers. One such method includes mapping the VLAN identifier, associated with the frame, to a number of extra bytes. The method also includes appending, to the payload, a quantity of bytes equal to the number of extra bytes. The method also includes setting at least one of the appended bytes to a value of a length provided with the frame. The method also includes transmitting the frame, including the appended bytes.

20 Claims, 5 Drawing Sheets

ENCODING VIRTUAL LAN TAGS

CROSS-REFERENCE TO RELATED APPLICATIONS

This application claims the benefit of U.S. Provisional Application No. 61/602,043, filed Feb. 22, 2012, which is hereby incorporated by reference in its entirety.

BACKGROUND

IEEE 802.1Q Virtual Local Area Network (VLAN) tagging is a mechanism for logically grouping devices that are physically networked on a single Local Area Network (LAN) into different VLANs. As a result of this separation, devices in different VLANs cannot directly communicate with each other at the Ethernet or Media Access Control (MAC) layer. That is, VLAN tagging makes it appear as if the devices are on different MAC layer networks, despite the fact that they exist on a single MAC layer network.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to encoding network identifiers in protocol data units, and more specifically, to encoding Virtual Local Area Network (VLAN) identifiers into a Media Access Control (MAC) frame.

Figure 1:
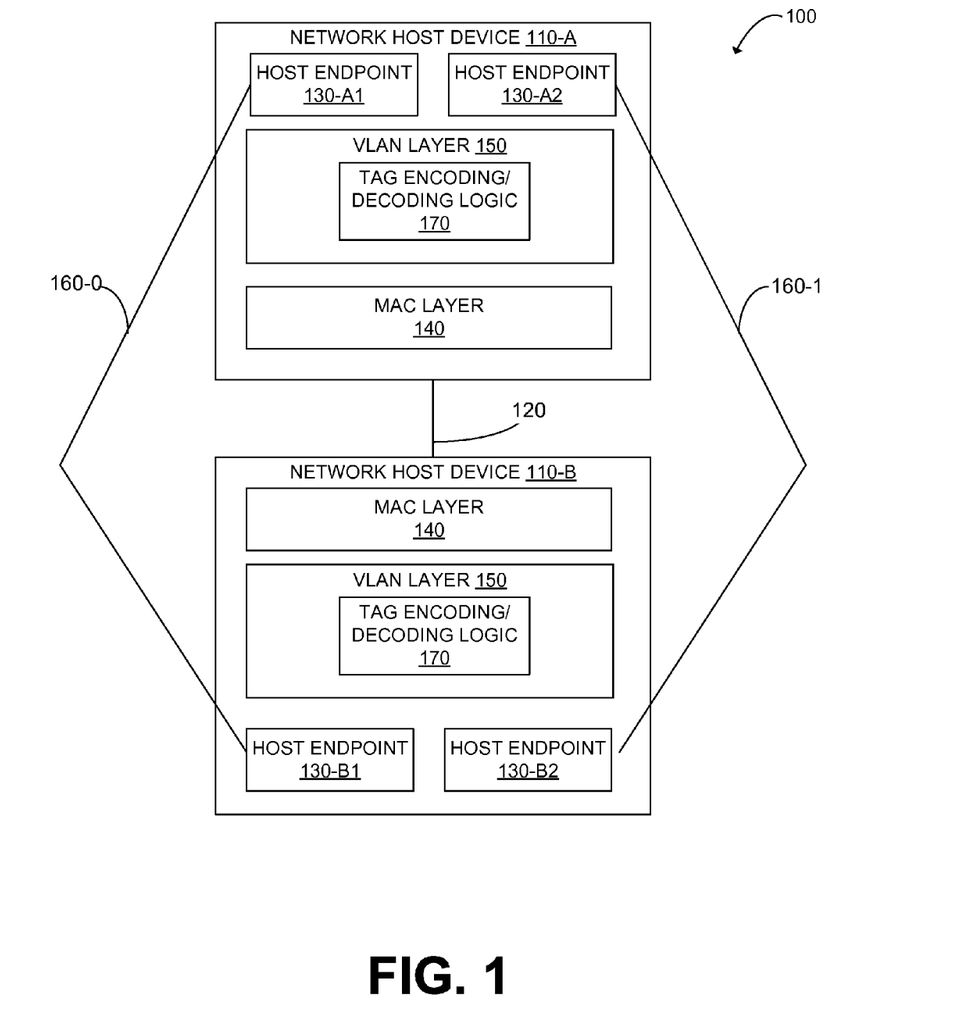
FIG. 1 is a block diagram of a system that includes network host device(s) according to some embodiments disclosed herein.

FIG. 1 is a system diagram illustrating a portion of a local area network (LAN) 100 that includes network host devices operating according to some embodiments of the present disclosure. The LAN 100 includes network host devices 110A, B, which are coupled to each other through a physical link 120. The LAN 100 also includes one or more host endpoints 130 residing in each network host device 110. In this example, network host device 110A includes host endpoint 130A-1 and host endpoint 130A-2 while network host device 110B includes host endpoint 130B-1 and host endpoint 130B-2.

Each host endpoint 130 provides specific functionality for the network host device 110. Host endpoints 130 are usually implemented as software modules and may implement, for example, a set-top box, a home network application, a router, a modem, etc. In some contexts, a host endpoint 130 may be referred to as a service/application functional entity (SAFE).

Each network host device 110 also includes a Media Access Control (MAC) layer 140, which allows host endpoints 130 residing on different network host devices 110 to communicate with each other. To this end, a MAC layer 140 provides services for transmitting and receiving MAC frames. In some embodiments, each host endpoint 130 has its own MAC address.

A network host device 110 also includes a virtual local area network (VLAN) layer 150. As noted above, the host endpoints 130 reside on a single physical LAN 100, coupled via the physical link 120. The VLAN layer 150 separates MAC endpoints that are physically coupled to a single LAN 100, such as host endpoints 130, into different VLANs 160. Thus, host endpoints 130 on different VLANs 160 appear to be on different MAC layer networks, despite the fact that they exist on a single MAC layer network. In this example, host endpoint 130A-1 and host endpoint 130B-1 belong to VLAN 160-0 while host endpoint 130A-2 and host endpoint 130B-2 belong to VLAN 160-1.

The VLAN layers 150 accomplish this by forwarding MAC layer frames destined for a host endpoint 130 on a particular VLAN 160 only to other host endpoints 130 on the same VLAN 160. In this manner, the VLAN layers 150 prevent host endpoints 130 that belong to different VLAN layers 150 from communicating directly with each other at the Media Access Control (MAC) layer. In this example, the VLAN layers 150 prevent endpoints on VLAN 160-0 (host endpoint 130A-1 and host endpoint 130B-1) from communicating at the MAC layer with endpoints on VLAN 160-1 (host endpoint 130A-2 and host endpoint 130B-2). However, the VLAN layers 150 allow host endpoint 130A-1 and host endpoint 130B-1 to communicate at the MAC layer, as can host endpoint 130A-2 and host endpoint 130B-2.

The VLAN layers 150 provide this functionality for broadcast frames also, such that broadcast MAC layer frames destined for VLAN 160-0 are forwarded to host endpoint 130A-1 and host endpoint 130B-1, but not to host endpoint 130A-2 and host endpoint 130B-2. Similarly, broadcast MAC layer frames destined for VLAN 160-1 are forwarded to host endpoint 130A-2 and host endpoint 130B-2 but not to host endpoint 130A-1 and host endpoint 130B-1. Multicast MAC layer frames are handled in an analogous manner.

To accomplish this separation into different VLANs 160, tag encoding/decoding logic 170 within a VLAN layer 150 inserts and removes VLAN tags from MAC layer frames. More specifically, when operating in a transmitting role, the tag encoding/decoding logic 170 appends an encoded VLAN tag at the end of the payload provided by the host endpoint 130, rather than inserting the VLAN tag into the MAC layer header. When operating in a receiving role, the tag encoding/decoding logic 170 decodes the encoded VLAN tag that is appended to the payload of the frame. This technique allows more efficient handling of unicast, multicast and broadcast frames, as will be explained in further detail below.

The LAN 100 illustrated in FIG. 1 involves network host devices 110 which are coupled via a single physical link 120. This physical link 120 may be embodied, for example, by a Media Independent Interface (MTI) or a Reduced Media Independent Interface (RMII). However, the tag encoding techniques disclosed herein also apply to LANs 100 that involve more than one physical link 120.

Figure 2:
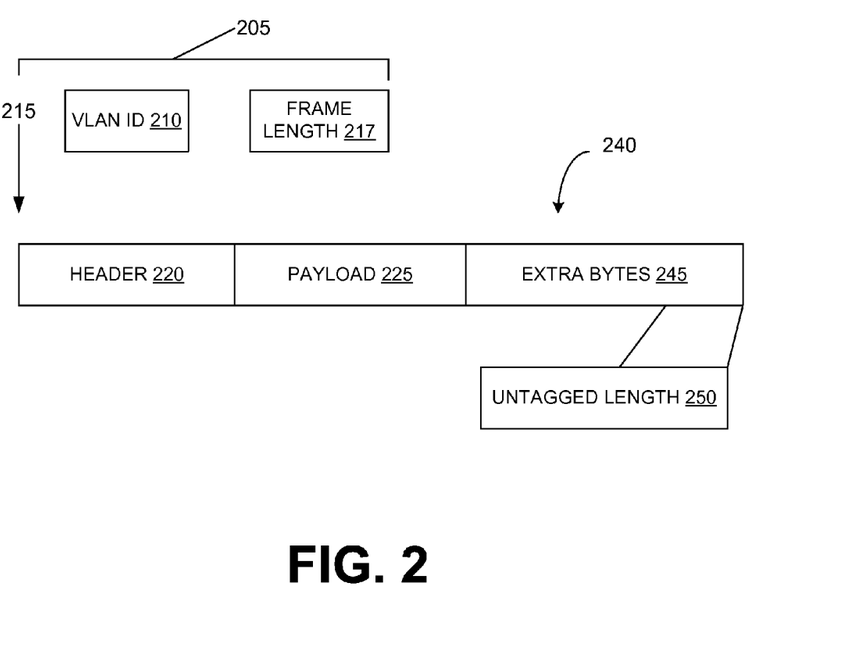
FIG. 2 is a diagram illustrating operation of tag encoding logic residing within a network host device as shown in FIG. 1, according to some embodiments disclosed herein.

FIG. 2 is a diagram illustrating operation of the tag encoding/decoding logic 170 (FIG. 1) in transmitting and receiving a MAC frame using an encoded VLAN tag. The tag encoding/decoding logic 170 in a transmitting network host device 110 (FIG. 1) receives parameters 205 from a host endpoint 130 (FIG. 1). The parameters 205 include a VLAN identifier 210, pointer to a MAC frame 215, and a length 217 of the entire frame. The use of a pointer allows the MAC frame 215 to be stored in the memory of the host endpoint 130 and avoids a frame copy by the tag encoding/decoding logic 170.

The MAC frame 215 includes a header 220 and a payload 225. In some embodiments, such as those implemented with IEEE 802.3, the header 220 includes a length field. In such embodiments, the host endpoint 130 that provides the MAC frame 215 sets the value of the length field in the header to the size of the payload 225. Other embodiments, such as those implemented with Ethernet II, do not include a length field in the header 220, and the physical layer of the receiver determines the length of a received frame. To handle both types of embodiments, the VLAN layer 150 obtains the length 217 from the host endpoint 130, rather than relying on a length field in the header 220.

Having obtained the MAC frame 215, the frame length 217, and the VLAN identifier 210 from a host endpoint 130, the tag encoding/decoding logic 170 in the transmitting network host device 110 encodes the VLAN identifier 210 by appending a VLAN tag 240 to the payload 225 of the MAC frame 215. The VLAN tag 240 is composed of a specific number of extra bytes 245, at least some of which are set to a particular value as described herein. The quantity of extra bytes 245 is derived from the VLAN identifier 210 provided by the host endpoint 130. More specifically, NumExtraBytes=m*(VlanId+1), where m is the minimum number of extra bytes needed to store the frame length, m>=1 and VlandId>=0. For Ethernet, m=2 since the maximum frame length is 1514 bytes (excluding the cyclic redundancy check or CRC), but the techniques disclosed herein apply to other values of m. In the case of m=2, a VLAN identifier 210 of 0 results in a 2-byte VLAN tag 240, a VLAN identifier 210 of 1 results in a 4-byte VLAN tag 240, and so on.

Notably, the tag encoding/decoding logic 170 sets the value of at least one of the extra bytes 245 to the value of the frame length 217 passed in by the host endpoint 130. Because this frame length 217 represents the length before tagging, this will be referred to hereinafter as the untagged frame length 250, i.e., not accounting for the VLAN tag 240.

The tag encoding/decoding logic 170 in the transmitting network host device 110 then transmits the MAC frame 215, including the extra bytes 245, on the LAN 100 (FIG. 1). Notably, the tag encoding/decoding logic 170 in the transmitting network host device 110 does not modify untagged frame length 250 to account for the extra bytes 245.

The tag encoding/decoding logic 170 in the receiving network host device 110 receives the transmitted MAC frame 215. As noted above, the MAC frame 215 includes extra bytes 245 appended to the payload 225, but the untagged frame length 250 does not reflect this. Thus, the receiving network host device 110 uses another mechanism, such as a silence period or an end-of-frame symbol, to determine the last byte in the MAC frame 215, and therefore the total number of bytes in the received frame.

The tag encoding/decoding logic 170 in the receiving network host device 110 then decodes the VLAN identifier 210 as follows. Having determined the position of the last byte in the payload 225, the receiving tag encoding/decoding logic 170 retrieves the untagged frame length 250 from the value stored in the last m bytes of the extra bytes 245 and calculates the number of extra bytes 245 as the difference between the total number of bytes (including the extra bytes 245) and the retrieved untagged frame length 250. The receiving network host device 110 then maps this quantity of extra bytes 245 to the VLAN identifier 210 using the expression VlanId=NumExtraBytes/m−1.

The tag encoding/decoding logic 170 in the receiving network host device 110 then provides the decoded VLAN identifier 210, the untagged frame length 250 and the MAC frame 215 to the consumer of the frame. As noted above, this consumer may be a host endpoint 130 such as a service/application functional entity (SAFE).

Thus, the tagging techniques disclosed herein use memory more efficiently than conventional techniques. Conventional VLAN tagging techniques construct a new frame so that the entire frame resides in a continuous memory buffer. This is accomplished by first copying the header 220 to a transmission buffer, then inserting a special VLAN header, then copying the payload 225 to the transmission buffer at a location next to the VLAN header. The tagging techniques disclosed herein append the VLAN tag 240 to the payload 225 instead of inserting the VLAN tag 240 into the header 220. This allows the MAC frame 215 to remain as a series of contiguous bytes (now including additional bytes after the payload 225). Since the bytes remain contiguous, the network host device 110 can use a pointer to (i.e., the address of) the MAC frame 215, rather than copying the MAC frame 215 from the host endpoint 130.

The tagging techniques disclosed herein are applicable to unicast, multicast, and broadcast traffic. However, the efficiency advantage is even more pronounced during multicast or broadcast transmission. Transmitting a multicast or broadcast frame using conventional header insertion tagging methods requires the VLAN layer 150 to make a copy of the header 220 and the payload 225 for each VLAN, then to change the VLAN tag in the copied header 220 for each different VLAN of the multicast (or for all VLANs in the cast of broadcast). Finally, the VLAN layer 150 transmits each of the modified header copies, along with copies of the payload 225. However, as noted above, the tagging techniques disclosed herein instead can utilize a pointer to the MAC frame 215. For each VLAN of the multicast, the VLAN layer 150 encodes a different VLAN tag 240 into the extra bytes 245 appended to the end of the payload 225.

Figure 3:
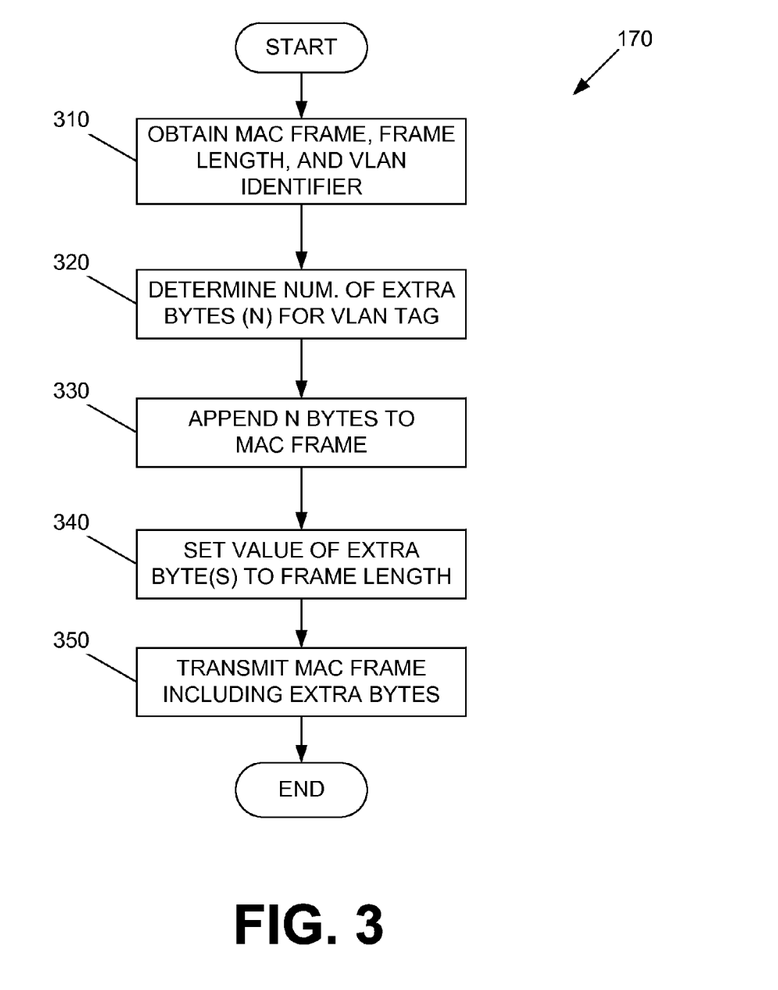
FIG. 3 is a flowchart illustrating operation of an encoding portion of tag encoding logic residing within a network host device as shown in FIG. 1, according to some embodiments disclosed herein.

FIG. 3 is a flowchart illustrating the operation of portions of the tag encoding/decoding logic 170 (FIG. 1) and the VLAN layer 150 (FIG. 1) according to some embodiments disclosed herein. More specifically, the flowchart of FIG. 3 illustrates a process of encoding a VLAN tag 240 (FIG. 2) into a MAC frame 215 (FIG. 2) and transmitting the tagged MAC frame 215. Alternatively, the flowchart of FIG. 3 may be viewed as implementing various steps of a method performed by the tag encoding/decoding logic 170.

The transmit process begins at reference number 310, where the VLAN layer 150 obtains, from a host endpoint 130 (FIG. 1), a MAC frame 215 (FIG. 2) for transmission on a particular VLAN 160 (FIG. 1). The VLAN 160 is identified by a VLAN identifier 210 (FIG. 2). Various mechanisms may be used to obtain the MAC frame 215 from the host endpoint 130. In one embodiment, the VLAN layer 150 exports a Transmit function which takes as parameters the VLAN identifier 210, the frame length 217 (FIG. 2), and a pointer to the MAC frame 215. In other embodiments, the Transmit function may use separate frame header and frame payload parameters rather than accepting a single parameter representing a contiguous frame.

Next, at reference number 320, the VLAN layer 150 determines a quantity of extra bytes 245 (FIG. 2) to be appended to the MAC frame 215, to carry the VLAN tag 240 (FIG. 2) that corresponds to the VLAN identifier 210. These extra bytes 245 may thus be viewed as tag bytes. The quantity of extra bytes 245 is based on the value of the VLAN identifier 210. That is, there is a one-to-one mapping between a VLAN identifier 210 and the number of bytes used to carry the VLAN tag 240, expressed as NumExtraBytes=m*(VlanId+1). In some embodiments, the mapping is expressed as NumExtraBytes=2*(VlanId+1). This may be implemented, for example, by performing a left shift operation on the VLAN identifier 210 and then adding 2.

Next, at reference number 330, the VLAN layer 150 appends N bytes to the payload 225 (FIG. 2) of the MAC frame 215, where N is the number calculated at block 320. At reference number 340, the VLAN layer 150 sets the value of at least the last m bytes of the appended extra bytes 245 to the value of the frame length 217. In other words, the end of the MAC frame 215 includes a series of bytes, and m of these last bytes are set to the value of the frame length 217. As noted above, the frame length 217 is a parameter passed in from the host endpoint 130 and is also referred to herein as the untagged frame length 250 (FIG. 2). In this manner, one or more of the extra bytes 245 carry the untagged frame length 250 of the MAC frame 215. In some embodiments, the last one of the extra bytes 245 carries the untagged frame length 250. However, other predefined positions in the extra bytes 245 may be used, or all of the extra bytes 245 may be used to carry the untagged frame length 250.

As noted above, the VLAN identifier 210 determines the number of extra bytes 245, but the value carried in these extra bytes 245 is the untagged frame length 250 (not including the extra bytes 245). Thus, it is the combination of the number of extra bytes 245, and the untagged frame length 250 stored therein, that encodes the VLAN identifier 210 obtained at block 310. As will be explained in more detail below, the VLAN layer 150 in the receiving network host device 110 decodes the VLAN identifier 210 by looking at both the number of extra bytes 245 and the untagged frame length 250 stored therein.

Having tagged the MAC frame 215 with an encoded VLAN identifier 210, at reference number 350 the VLAN layer 150 transmits the MAC frame 215, including the extra bytes 245. In some embodiments, the transmission involves delivering the MAC frame 215 to a Network Interface Controller (NIC), which takes care of transmitting the MAC frame 215. In other embodiments, the transmission involves providing the MAC frame 215 to a physical layer network device (PHY), which takes care of transmitting the MAC frame 215.

Notably, the VLAN layer 150 transmits the MAC frame 215 without modifying untagged frame length 250 to account for the extra bytes 245. As will be explained below, the VLAN layer 150 in the receiving network host device 110 (FIG. 1) uses a mechanism other than a length field in the header 220 (FIG. 2) to determine the actual length of the MAC frame 215 including the extra bytes 245. The process of FIG. 3 is then complete.

Figure 4:
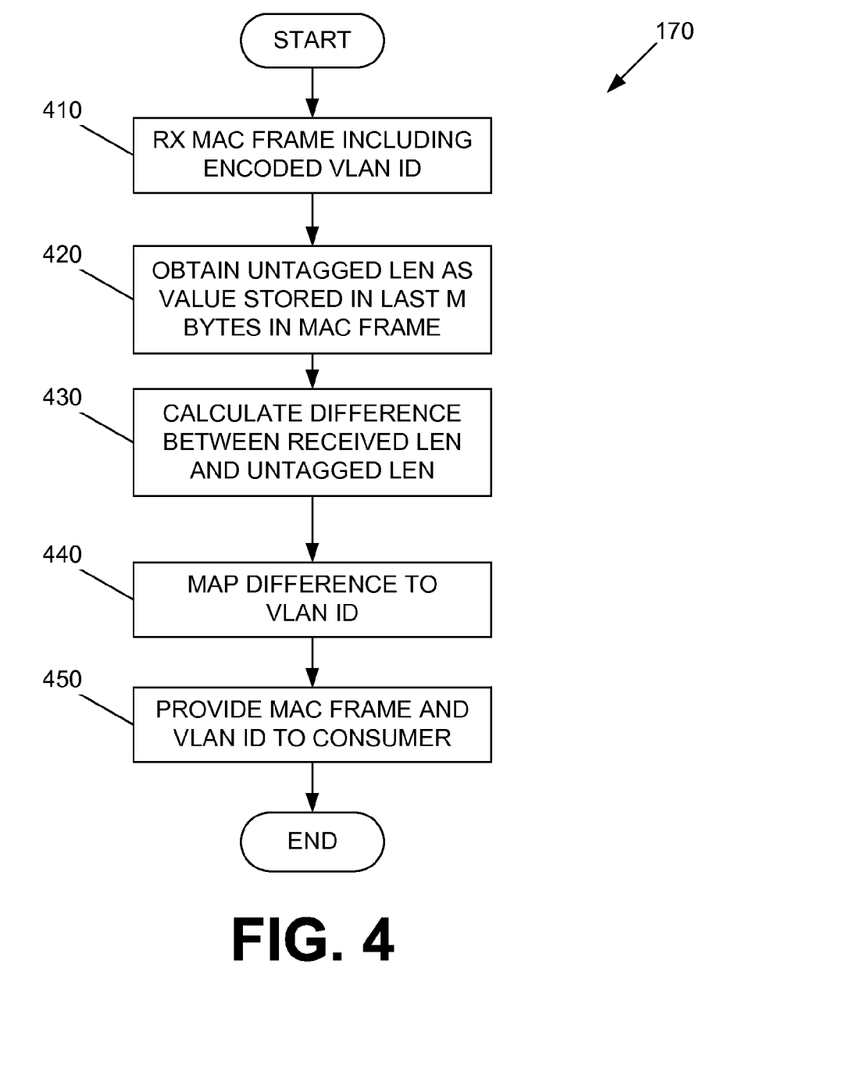
FIG. 4 is a flowchart illustrating operation of a decoding portion of tag encoding logic residing within a network host device as shown in FIG. 1, according to some embodiments disclosed herein.

FIG. 4 is a flowchart illustrating the operation of other portions of the tag encoding/decoding logic 170 (FIG. 1) and the VLAN layer 150 (FIG. 1) according to some embodiments disclosed herein. More specifically, the flowchart of FIG. 4 illustrates a process of receiving a tagged MAC frame 215 (FIG. 2) and decoding a VLAN tag 240 (FIG. 2) carried in the MAC frame 215 to produce a VLAN identifier 210 (FIG. 2). Alternatively, the flowchart of FIG. 4 may be viewed as implementing various steps of a method performed by the tag encoding/decoding logic 170.

The receive process begins at reference number 410, where the VLAN layer 150 obtains a MAC frame 215 (FIG. 2) received on the LAN 100 (FIG. 1), as well as a length of the received frame. As described above, the received MAC frame 215 includes an encoded VLAN tag inserted by the transmitter. In some embodiments, the received MAC frame 215 is obtained from a Network Interface Controller (NIC). In other embodiments, the received MAC frame 215 is obtained from a physical layer network device (PHY). In either case, the length of the received frame is provided to the VLAN layer 150 by the physical layer. The physical layer may use various mechanism to determine the length of a receive frame, such as an interframe gap (IFG) or a predefined symbol that marks the end of a frame.

Next, at reference number 420, the VLAN layer 150 retrieves the value stored in the last m bytes of the received MAC frame, where (as noted above) m is a predetermined parameter related to the maximum size of a MAC frame. The value stored in the last m bytes of the received frame is the untagged frame length 250 (FIG. 2) inserted by the transmitter.

At reference number 430, the VLAN layer 150 calculates the difference between the length of the received frame (provided by the physical layer), obtained at reference number 410, and the untagged frame length 250, obtained at reference number 420. This difference represents the number of encoded tag bytes appended to the frame by the transmitter (i.e., the number of extra bytes 245).

Next, at reference number 440, the VLAN layer 150 maps the number of extra bytes 245 obtained at block 430 to the VLAN identifier 210 (FIG. 2). The VLAN identifier 210 is expressed as VlanId=NumExtraBytes/m−1, where NumExtraBytes is the number of extra bytes 245 inserted by the transmitter. In some embodiments, the mapping is expressed as VlandId=NumExtraBytes/2−1, i.e., this difference is reduced by 2, and then reduced by half to produce the VLAN identifier 210. A right shift operation may be used to perform the reduction by 2. In this manner, the VLAN layer 150 decodes the VLAN identifier 210 from both the position of, and the value stored in, the extra bytes 245 in the MAC frame 215.

Having decoded the VLAN identifier 210, at reference number 450 the VLAN layer 150 provides the VLAN identifier 210 and at least a portion of the MAC frame 215 to a consumer of the MAC frame 215. The consumer may be, for example, a host endpoint 130 (FIG. 1), a network protocol layer, and/or a service/application functional entity. In some embodiments, the VLAN layer 150 provides the consumer with the VLAN identifier, untagged frame length 250 and a pointer to the MAC frame 215. Because the consumer is provided with the untagged frame length 250, the consumer can remain unaware of the presence of extra bytes 245 processed by the VLAN layer 150. The process of FIG. 4 is then complete.

Figure 5:
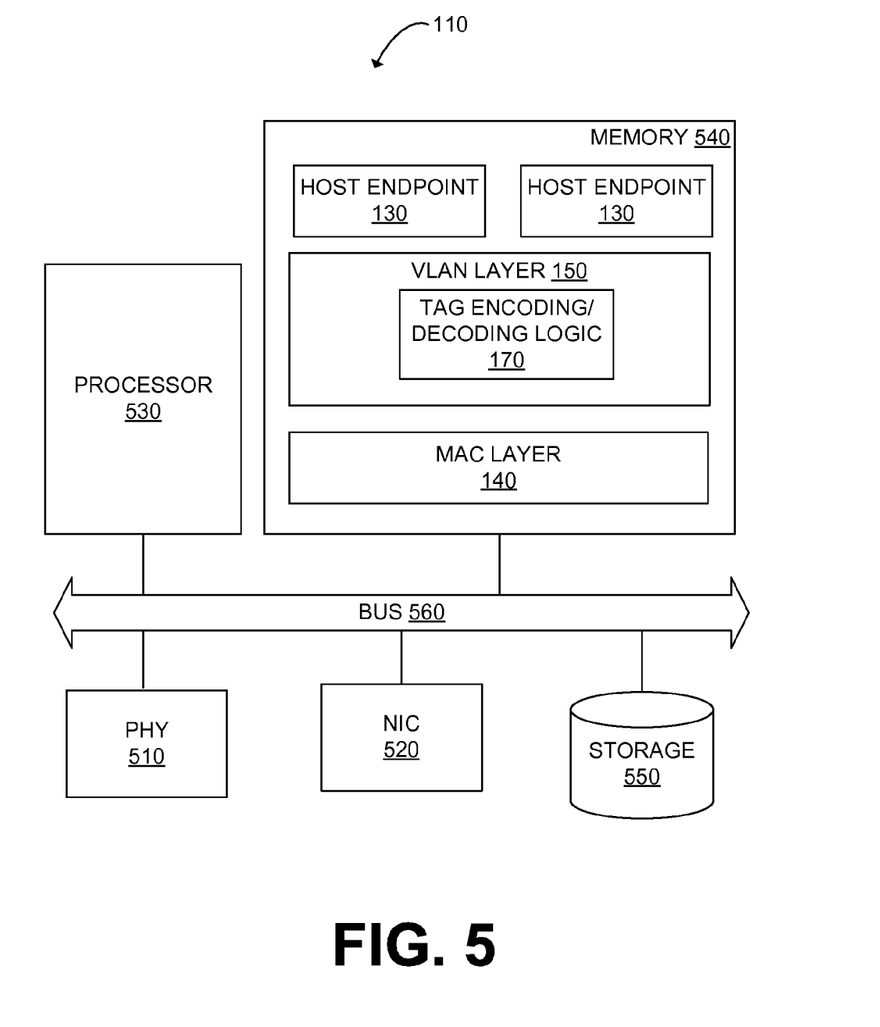
FIG. 5 is a component block diagram of a network host device as shown in FIG. 1, according to some embodiments disclosed herein.

FIG. 5 is a block diagram of a network host device 110 according to various embodiments of the present disclosure. The network host device 110 includes a physical layer network device (PHY) 510, a network interface controller (NIC) 520, a processor 530, memory 540, and storage 550, coupled by a bus 560. These and various other components are contained within a housing (not shown). In this example embodiment, host endpoints 130, VLAN layer 150, tag encoding/decoding logic 170, and MAC layer 140 reside in memory 540 and take the form of instructions executed by the processor 530.

The processor 530 may be implemented as a baseband processor, a digital signal processor (DSP), an application processor, a microcontroller, a network processor, or combinations thereof. In some embodiments, the processor 530, memory 540, and/or PHY 505 may be integrated on the same chip.

Any logic or application described herein (including tag encoding/decoding logic 170) that comprises software or code can be embodied in any non-transitory computer-readable medium for use by or in connection with an instruction execution system such as, for example, the processor 530. In this sense, the logic may comprise, for example, statements including instructions and declarations that can be fetched from the computer-readable medium and executed by the processor 530. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although tag encoding/decoding logic 170 and other various components described herein may be embodied in software, firmware, or code executed by a processor as discussed above, as an alternative the same may also be embodied in dedicated hardware or a combination of software, general-purpose hardware, and dedicated hardware. If embodied in dedicated hardware, each can be implemented as a circuit or state machine that employs any one of or a combination of a number of technologies. These technologies may include, but are not limited to, discrete logic, a programmable logic device, an application specific integrated circuit (ASIC), a field programmable gate array (FPGA), a system on chip (SoC), a system in package (SiP), or any other hardware device having logic gates for implementing various logic functions upon an application of one or more data signals, Such technologies are generally well known by those skilled in the art and, consequently, are not described in detail herein.

The flowcharts herein show the functionality and operation of an implementation of portions of the tag encoding/decoding logic 170. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the processor 530 in a computer system or other system. The machine code may be converted from the source code, etc. If embodied in hardware, each block may represent a circuit or a number of interconnected circuits to implement the specified logical function(s).

Although the diagram of FIG. 5 shows a specific order of execution, it is understood that the order of execution may differ from that which is depicted. For example, the order of execution of two or more blocks may be scrambled relative to the order shown. Also, two or more blocks shown in succession in the diagram of FIG. 5 may be executed concurrently or with partial concurrence. Further, in some embodiments, one or more of the blocks shown in the diagram of FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure. It is understood that the diagram of FIG. 5 merely provide an example of the many different types of functional arrangements that may be employed to implement the operation of portion(s) of the tag encoding/decoding logic 170 as described herein. As an alternative, the diagrams of diagram of FIG. 5 may be viewed as depicting an example of steps of a method implemented in the tag encoding/decoding logic 170 according to one or more embodiments.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method of encoding a virtual local area network (VLAN) identifier into a frame comprising a header and a payload, the method comprising:
    mapping the VLAN identifier, associated with the frame, to a number of extra bytes;
    appending, to the payload, a quantity of bytes equal to the number of extra bytes;
    setting at least one of the appended bytes to a value of a length parameter provided with the frame; and
    transmitting the frame, including the appended bytes.

2. The method of claim 1, wherein the setting comprises:
    setting contents of m bytes at an end of the appended bytes to the value of the length parameter; wherein m is an integer.

3. The method of claim 1, wherein the mapping comprises:
    computing the number of extra bytes as a product of m and the sum of 1 and the VLAN identifier, wherein m represents a minimum number of bytes required to carry a maximum size frame, and m is an integer.

4. The method of claim 1, wherein the mapping comprises:
    computing the number of extra bytes as the sum of 2 and twice the VLAN identifier.

5. The method of claim 1, wherein the mapping comprises:
    performing a left shift operation on the VLAN identifier; and
    adding 2 to the left-shifted VLAN identifier to produce the number of extra bytes.

6. The method of claim 1, further comprising:
    obtaining the frame from a network layer driver.

7. The method of claim 1, further comprising:
    obtaining the frame from a service/application functional entity (SAFE).

8. The method of claim 1, further comprising:
    obtaining the frame from a Media Access Control (MAC) layer driver.

9. The method of claim 1, wherein the transmitting comprises:
    delivering the frame to a Network Interface Controller (NIC).

10. The method of claim 1, wherein the transmitting comprises:
delivering the frame to a physical layer transceiver (PHY).

11. The method of claim 1, wherein the transmitting comprises:
delivering the frame to a physical layer transceiver (PHY) via a Management Independent Interface (MII).

12. A method of decoding a virtual local area network (VLAN) identifier from a frame comprising a header and a payload, the method comprising:
receiving the frame, having a length, on a local area network (LAN);
obtaining an untagged length value from m bytes at an end of the frame, wherein m is an integer;
calculating a difference between the length of the received frame and the untagged length value;
mapping the difference to obtain the VLAN identifier; and
providing the VLAN identifier to a consumer of the frame.

13. The method of claim 12, wherein the length of the received frame is determined from a frame delimiter recognized by a physical layer.

14. The method of claim 12, wherein the length of the received frame is determined from an interframe gap (IFG) recognized by a physical layer.

15. The method of claim 12, wherein the mapping comprises:
computing the VLAN identifier as one less than the difference divided by m, wherein m represents a minimum number of bytes required to carry a maximum size frame.

16. The method of claim 12, wherein the mapping comprises: subtracting 2 from the difference to obtain an intermediate value; and performing a right shift operation on the intermediate value to produce the VLAN identifier.

17. The method of claim 12, wherein the consumer is a network layer of a protocol stack.

18. The method of claim 12, wherein the consumer is a Media Access Control (MAC) layer of a protocol stack.

19. A device for handling a frame comprising a header and a payload, the device comprising:
a physical layer device (PHY); and
processing circuitry configured to:
map a VLAN identifier, associated with the frame, to a number of extra bytes;
append, to the payload, a quantity of bytes equal to the number of extra bytes;
set at least one of the appended bytes to a length parameter provided with the frame; and
provide the frame, including the appended bytes, to the PHY for transmission.

20. The device of claim 19, the processing circuitry further configured to compute the number of tag bytes as a product of m and the sum of 1 and the VLAN identifier, wherein m represents a minimum number of bytes required to carry a maximum size frame, and m is an integer.

\* \* \* \* \*